United States Patent [19]

Parker

[11] 4,310,960

[45] Jan. 19, 1982

[54] METHOD OF FABRICATION OF A FORMED PLATE, COUNTERFLOW FLUID HEAT EXCHANGER AND APPARATUS THEREOF

[75] Inventor: Kenneth O. Parker, Rolling Hills Estates, Calif.

[73] Assignee: The Garrett Corporation, Los Angeles, Calif.

[21] Appl. No.: 904,253

[22] Filed: May 9, 1978

Related U.S. Application Data

[60] Continuation of Ser. No. 550,409, Feb. 18, 1975, which is a division of Ser. No. 351,423, Apr. 16, 1973, abandoned.

[51] Int. Cl.$^3$ ............................................. B23P 15/26
[52] U.S. Cl. ................................. 29/157.3 R; 165/166
[58] Field of Search ...................... 29/152.3, 157.3 R; 165/166; 113/118 D

[56] References Cited

U.S. PATENT DOCUMENTS

| | | | |
|---|---|---|---|
| 2,281,154 | 4/1942 | Hromadko | 165/166 X |
| 2,287,281 | 6/1942 | Thomas | 62/119 |
| 2,511,084 | 6/1950 | Shaw | 165/166 |
| 2,875,986 | 3/1959 | Holm | 165/165 X |
| 3,017,161 | 1/1962 | Slaasted et al. | 165/166 |
| 3,240,268 | 3/1966 | Armes | 29/157.3 R |
| 3,380,517 | 4/1968 | Butt | 165/166 |
| 3,460,611 | 8/1969 | Folsom et al. | 165/166 |
| 3,537,165 | 11/1970 | Paddock et al. | 165/166 X |
| 3,702,021 | 11/1972 | Wolfe et al. | 113/118 D |
| 3,759,308 | 9/1973 | Gefauer | 165/167 X |
| 3,785,435 | 1/1974 | Stein et al. | 165/166 |
| 3,796,258 | 3/1974 | Malhotra et al. | 29/157.3 B |
| 3,894,581 | 7/1975 | Jacobsen et al. | 165/166 |

*Primary Examiner*—Nicholas P. Godici
*Assistant Examiner*—V. K. Rising

*Attorney, Agent, or Firm*—Henry M. Bissell; Albert J. Miller

[57] ABSTRACT

A heat exchanger of the formed plate type with a stack of relatively thin material, spaced heat transfer plates. The plates of the heat exchanger are arranged to define sets of multiple counterflow fluid passages for two separate fluid media alternating with each other. Passages of one set communicate with opposed manifold ports on opposite sides of the core matrix. Passages of the other set pass through the stack past the manifolds in counterflow arrangement and connect with inlet and outlet portions of an enclosing housing.

An assembly of two plates oppositely disposed establishes integral manifolds for one of the fluid media through the ports and the fluid passage defined between the plates. A third plate joined thereto further defines a passage for the second fluid media to flow between the inlet and outlet portions of the housing. The various fluid passages may be provided with flow resistance elements, such as fins, to improve the efficiency of heat transfer between adjacent counterflow fluids.

In each set of aligned ports, collars alternately large and small, are formed in nested arrangement so that the ports formed by adjacent plates bridge the inner spaces between the plates. Such construction permits communication with the aligned ports of alternate fluid channels which are closed to the outside between the heat exchanger plates.In fabrication of a core matrix, the parts are formed and cleaned and the braze alloy is deposited thereon along the surfaces to be joined. The parts are then stacked in the natural nesting configuration followed by brazing in a controlled-atmosphere furnace. The brazing is readily carried out by reason of the sealing construction of the described nesting arrangement.

5 Claims, 13 Drawing Figures

METHOD OF FABRICATION OF A FORMED PLATE, COUNTERFLOW FLUID HEAT EXCHANGER AND APPARATUS THEREOF

CROSS-REFERENCE TO RELATED APPLICATION

This application is a continuation of co-pending application Ser. No. 550,409, of Kenneth O. Parker for METHOD OF MAKING A FORMED PLATE TYPE HEAT EXCHANGER, filed Feb. 18, 1975, which is a division of application Ser. No. 351,423, filed Apr. 16, 1973 and now abandoned. Application Serial No. 550,895 of Kenneth O. Parker for FORMED PLATE TYPE HEAT EXCHANGER was also filed Feb. 1, 1975 as a continuation of said application Ser. No. 351,423 and has now issued as U.S. Pat. No. 4,073,340.

BACKGROUND OF THE INVENTION

1. Field of the Invention

This invention relates to recuperative heat exchangers of the formed plate type comprising a stacked plate arrangement with adjacent fluid passages in counterflow relation in the heat exchanger.

2. Description of the Prior Art

In numerous fluid flow processes it is necessary to either heat or cool one of the fluid streams. Various types of heat exchangers are used for this operation. One type often used is a plate type heat exchanger which may be formed of a multiplicity of plates stacked together and spaced in side by side relation. The spaces between adjacent plates provide flow paths adjacent each plate. Flow passages are arranged so that alternately one fluid stream passes through the passages on one side of the plate and the other stream flows on the other side of the plate.

In certain applications such as vehicle type heat exchangers, high performance and efficiency are demanded with an inherent low cost, small volume and light weight. Early attempts to accomplish these objectives have incorporated designs employing solid spacers or bars to provide the boundary junctures of the plates and to channel the hot and cold fluids to and from a counterflow section of the heat exchanger. Such designs are characterized by components which are costly to fabricate and to join together in the overall structure. Additionally, problems of structure integrity associated with thermal inertia incompatibility of the core elements due to the different size and thickness thereof were experienced. The high cost and other problems associated with such structures preclude their suitability for vehicle gas turbine use.

For a heat exchanger to be acceptable for use with small gas turbine designs, particularly for road-type vehicle applications, a minimum of labor in fabrication is mandatory to keep the costs within reason. In order to accomplish this, a heat exchanger must be designed which has a minimum of parts which can be easily formed and assembled. Additionally, the costs of the materials must be kept as low as practical, while maintaining design objectives of high efficiency, compactness, and lightness of weight.

A critical aspect of the heat exchanger core fabrication lies in the means for sealing the adjacent plates near the extremity of the core matrix. In the prior art typically plates have been reinforced and sealed by bars which increase the thermal transient stress in the heat exchanger due to their different size from the adjacent plates, and therefore, resulting different heat conductivity characteristics.

Thus, it may be seen that it is essential in the design of a heat exchanger for the vehicle gas turbine market to provide a recuperator that achieves thermal inertial compatibility between the elements of the core and parts attached to the core, in addition to being capable of long life and constructed of parts which may be fabricated and assembled with a minimum amount of labor.

SUMMARY OF THE INVENTION

In brief, the present invention relates to plate type heat exchanger cores formed of a plurality of substantially identical, generally parallel flow plates having flat surfaces except for marginal lands extending around the perimeter of one surface of the plate and flanged collars extending around openings in opposite ends of the plates. Each plate is thereby provided with spaced apertures located adjacent each longitudinal end. The apertures form integral manifolds to provide flow paths for one of the two fluid media.

In one embodiment of the invention, the plates are stacked together in side-by-side nesting relation with one pair of plates joined to establish integral manifolds extending through the ends of the plates for one of the fluid media and having nesting collars for defining a fluid passage for the fluid between the formed sheets. The plates are so arranged that one of the fluid streams flows in one direction between adjacent streams of the other fluid which flows in an opposite direction, whereby the one stream is in optimized heat exchange relationship with the other stream of the different temperature.

In an alternate embodiment of the invention a counterflow heat exchanger is provided in an integral arrangement together with diagonal flow sections for directing a first fluid between opposed manifolds and the central heat exchanger section. The alternate pairs of plates form alternate passages for the respective fluid media, the gas flow passages extending completely through the heat exchanger section to permit passage of the gas therethrough between inlet and outlet openings in the housing enclosing the core. In the core proper, the fluid flow is counter-directional.

BRIEF DESCRIPTION OF THE DRAWING

A better understanding of the present invention may be had from a consideration of the following detailed description taken in conjunction with the accompanying drawing, in which.

DESCRIPTION OF THE PREFERRED EMBODIMENTS

Figure 1:
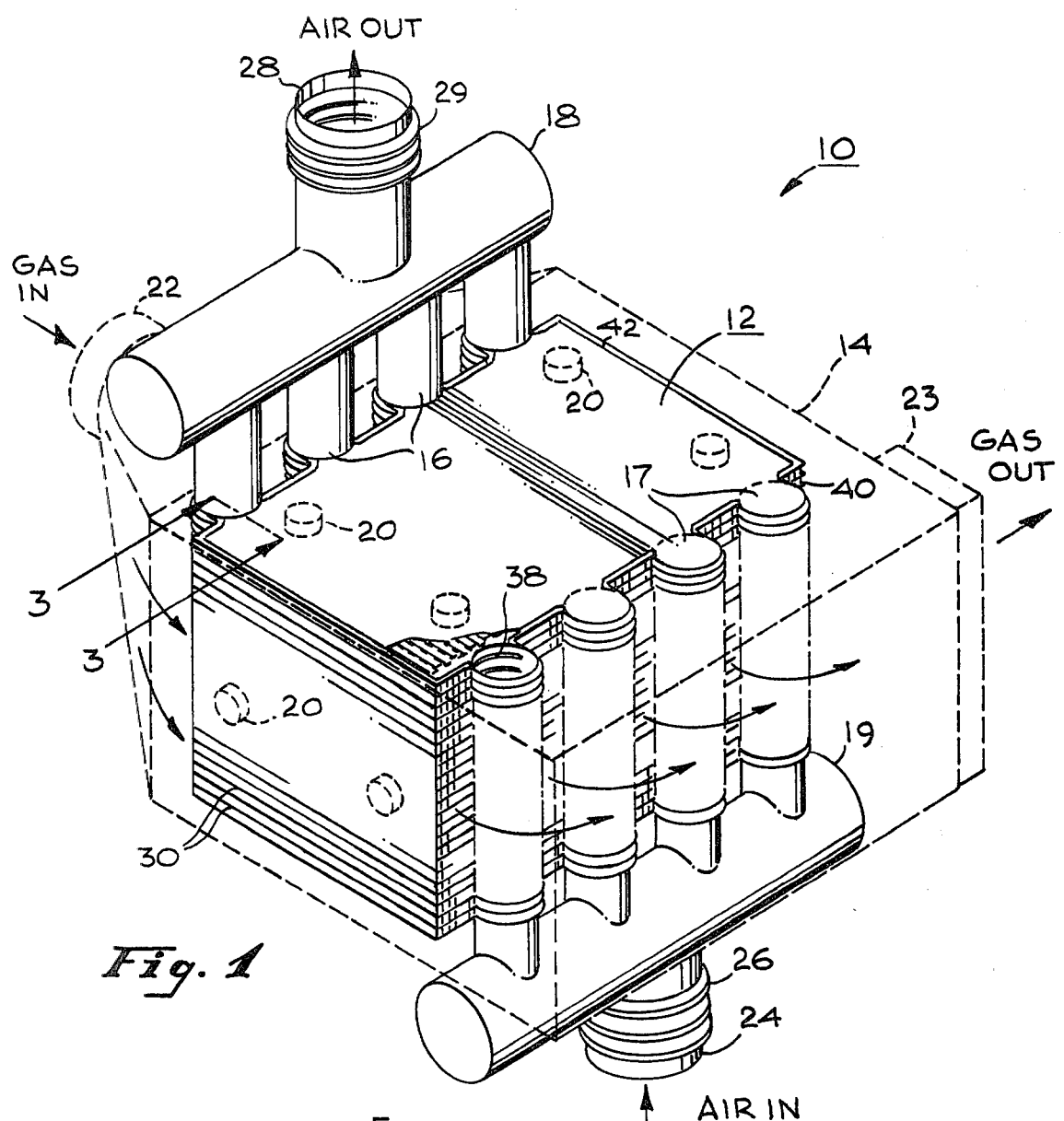
FIG. 1 is a perspective view of one particular arrangement in accordance with the present invention.

The embodiment of the invention as shown in FIG. 1 comprises a heat exchanger assembly 10 having a core 12 enclosed within a housing 14. The core is provided with integrally fashioned manifolds 16, 17 on opposite sides of the central heat exchanger, connected respectively to headers 18, 19. The heat exchanger core 12 is supported within the housing 14 by means of mounts 20. The housing 14 is provided with inlet and outlet passages 22 and 23 for passing a hot gas through the heat exchanger core 12 in intimate heat exchange relationship with air flowing between the respective manifolds 16, 17. In operation, air enters the header 19 through an inlet pipe 24 which incorporates a load compensating bellows portion 26 to adjust for dimensional variation, passes upward into the manifolds 17 and then into the air flow passages in the heat exchanger core 12. The air then flows upward through the manifolds 16 into the header 18 and out through an outlet pipe 28 which is also provided with a load compensating bellows portion 29. At the same time hot gas is flowing into the housing 14 through the inlet duct 22, thence through gas flow passages sandwiched between the air flow passages of the heat exchanger core 12, and finally out of the housing 14 through the outlet duct 23. It will thus be understood that the air and gas flow is in a direct counterflow relationship within the sandwich structure of the heat exchanger core 12.

Figure 2:
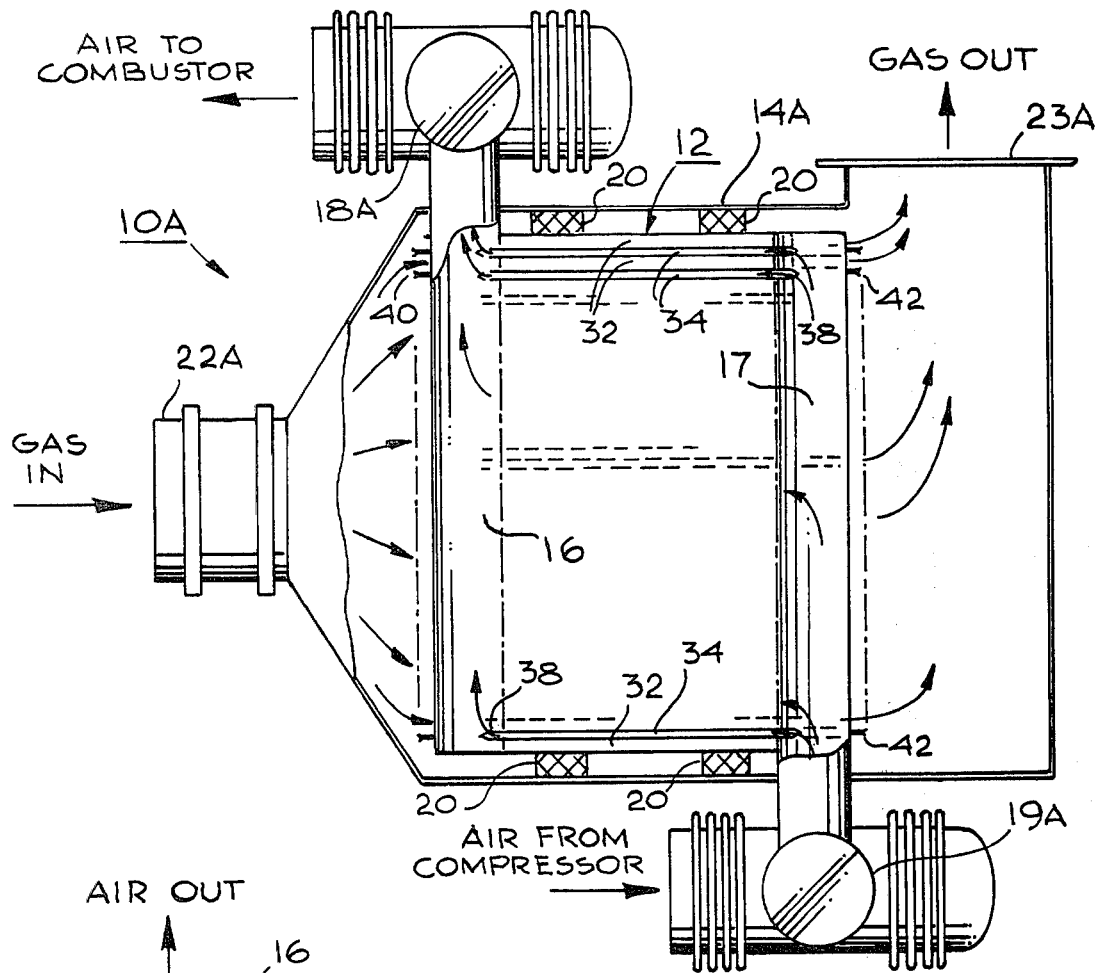
FIG. 2 is a side elevation of another arrangement in accordance with the invention, similar to that of FIG. 1, except that somewhat different housing and headering configurations are shown.

A similar assembly 10A is shown in a sectional elevation view of FIG. 2, in which the same heat exchanger core 12 is employed, but in which a slightly different housing 14A having inlet and outlet ducts 22A, 23A are provided. Also, the headering arrangements 18A and 19A are slightly different from those shown in FIG. 1.

Figure 3:
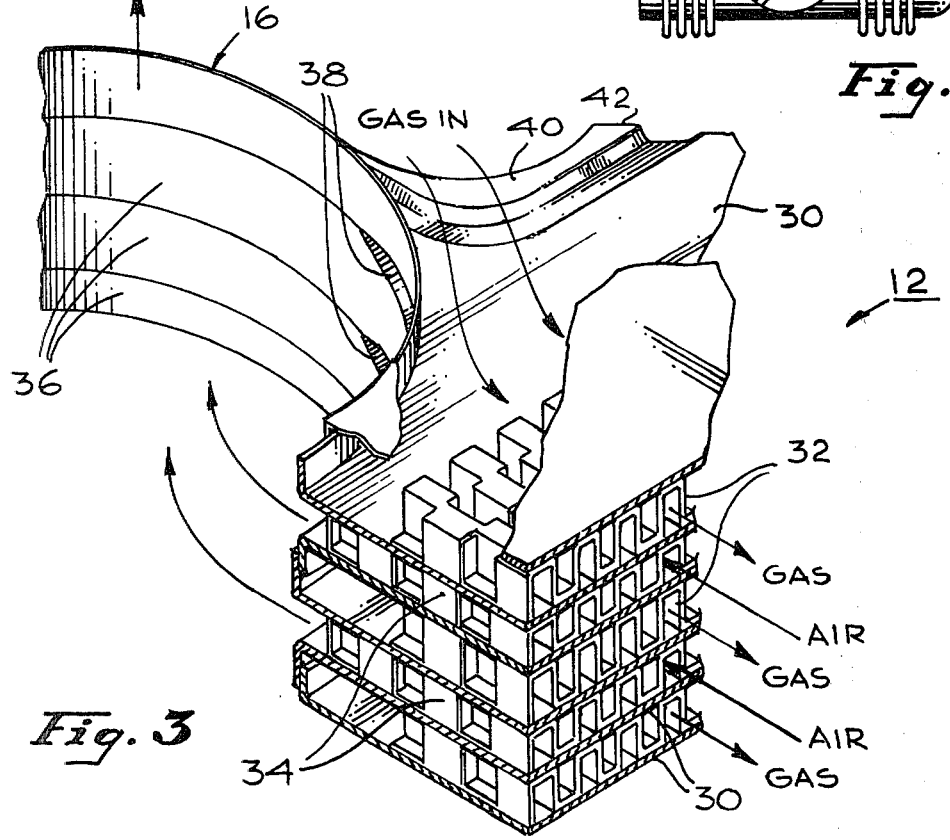
FIG. 3 is a perspective view of a portion of the arrangement of FIG. 1, taken in section at the arrows 3 thereof.

FIG. 3, which is a perspective view, partially broken away and partially in section, shows structural details of the portion of the core 12 at the section line arrows 3—3 of FIG. 1. The portion depicted in FIG. 3 is shown comprising a part of the core section 12 and a part of one of the air manifolds 16. The core section 12 includes a plurality of formed plates 30 sandwiched together with and separated from each other by respective layers of gas fins 32 and air fins 34. The formed plates 30 are provided with collars 36 to develop the manifold 16 extending into the sandwiched structure and define strategically located openings 38 for passing air between the manifold 16 and the air fins 34. Correspondingly, openings are provided at 40 for the passage of hot gasses from the outside of the core 12 to the gas passages containing the gas fins 32. Thus as may be seen from FIG. 3, the respective gas and air fin configurations within the sandwich structure of the core 12 serve to provide a certain rigidity and integrity to the structure while at the same time serving to provide the desired heat transfer between the adjacent gas and air streams while developing the desired turbulence in the respective fluid flows so as to enhance the heat transfer characteristics of the fluid-metal interface.

Figure 4:
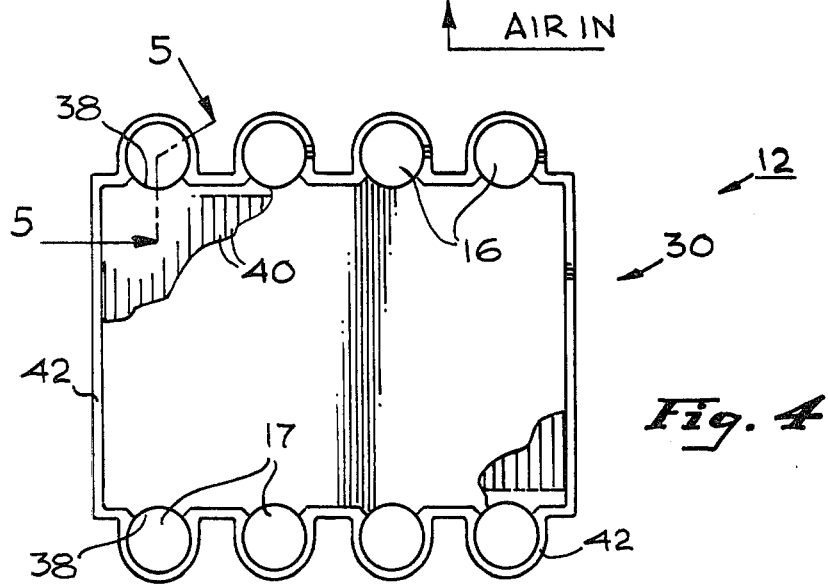
FIG. 4 is a plan view of the heat exchanger core of FIGS. 1 and 2.

FIG. 4 may be considered a plan view of the core 12 of FIG. 1. It may also be considered as representing in general outline from one of the formed plates 30 making up the core 12. As may be seen, the plate 30 is provided with an offset flange 42 extending about its periphery. This offset flange is for the purpose of joining to a similar flange on the plate of the next layer in the stack so as to define a fluid passage having openings communicating therewith only as indicated hereinabove; i.e. where the fluid passage is an air stream, openings communicating with the manifolds 16 and 17, whereas for a gas stream the openings communicate with the outside of the core 12 at segments between adjacent manifolds 16 and 17. Such a segment may be seen at 44 on the left-hand side of FIG. 5, which is a section of a portion of the core 12 taken along the line 5—5 of FIG. 4 looking in the direction of the arrows. Gas openings 40 and the juncture of adjacent flanges 42 are shown in segment 44 of FIG. 5. Air openings 38 are shown in FIG. 5 on the opposite side of the manifold 16 and communicating therewith.

Figure 6:
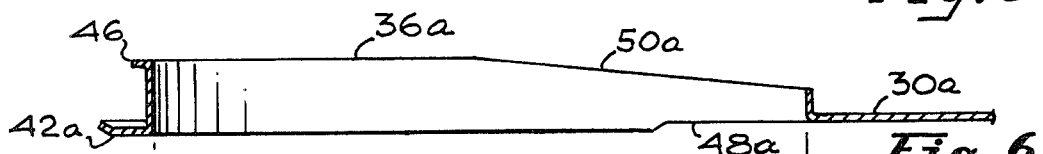
FIG. 6 is a side sectional view showing one of the elements employed in the core of FIG. 4.
Figure 7:
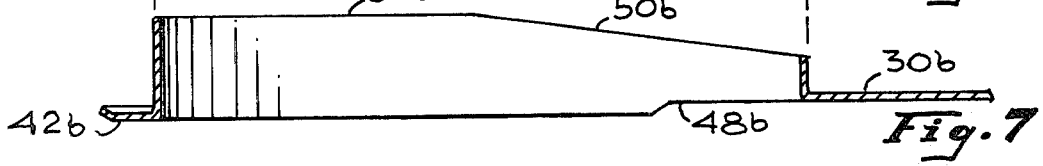
FIG. 7 is a side sectional view of another element employed in the arrangement of FIG. 4.
Figure 8:
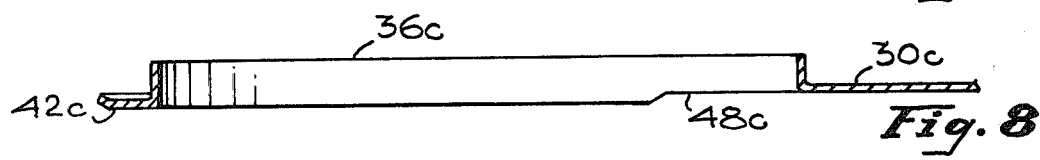
FIG. 8 is a side sectional view of a third element employed in the arrangement of FIG. 4.

The respective formed plates 30 which, with the gas fin elements 32 and the air fin elements 34, are nested together to make up the core structure 12 are fabricated in three different configurations. Each plate 30 is formed with a cuplike protrusion providing a collar 36 or a manifold section of each of the individual manifolds 16 and 17. The details of structural configuration of the respective formed plates 30 and the manner in which they are nested together in the core 12 may best be seen by reference to FIGS. 6–9. FIG. 6 shows a portion of plate 30a and a cup-like protrusion or collar 36a. FIG. 7 similarly depicts a formed plate 30b having a cup-like protrusion or collar 36b. FIG. 8 shows a corresponding formed plate 30c with its collar 36c. The plates 30a, 30b and 30c may be referred to respectively as "A-plates," "B-plates," and "C-plates." Each of the collars 36 of FIGS. 6–8 is provided with a corresponding flange portion 42a, 42b or 42c about its outer (left-hand) periphery. The A-plate collar 36a also has an additional reentrant portion 46 along the edge of the collar 36a opposite the flange 42a. It will be noted that the diameters of the collars 36b and 36c are the same but are slightly less than the diameter of the collar 36a, the outside diameters of collars 36b and 36c being fixed to match the inside diameter of collar 36a. Each of the plates of FIGS. 6–8 is provided with an offset segment 48a, 48b, 48c as the case may be. Also, plates 30a and 30b of FIGS. 6 and 7 have a diagonal cutout 50a and 50b removed from their respective collars 36a and 36b along the edge which is opposite to the offset segments 48a, 48b.

Figure 5:
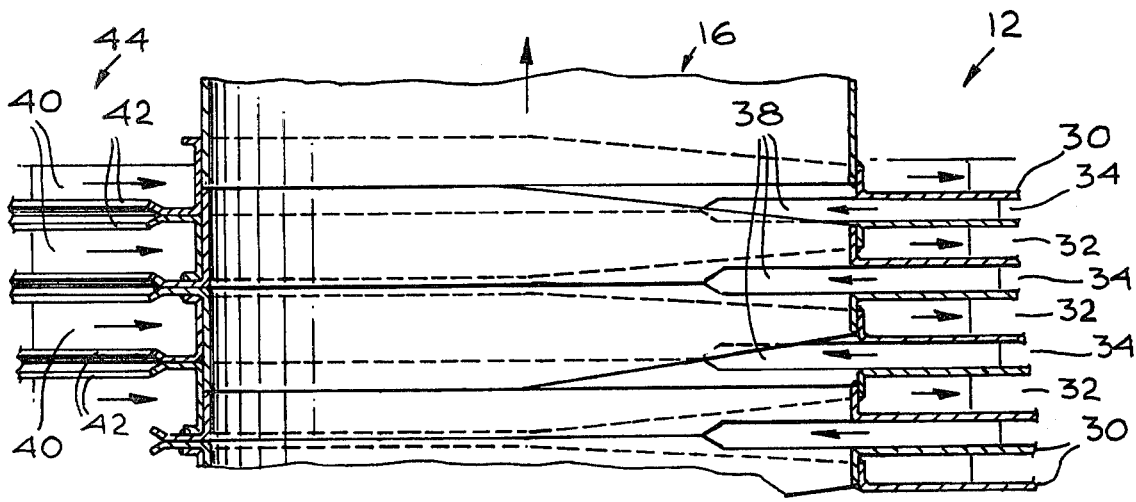
FIG. 5 is another sectional view of a portion of the arrangement of FIG. 4 taken at the arrows 5 thereof.
Figure 9:
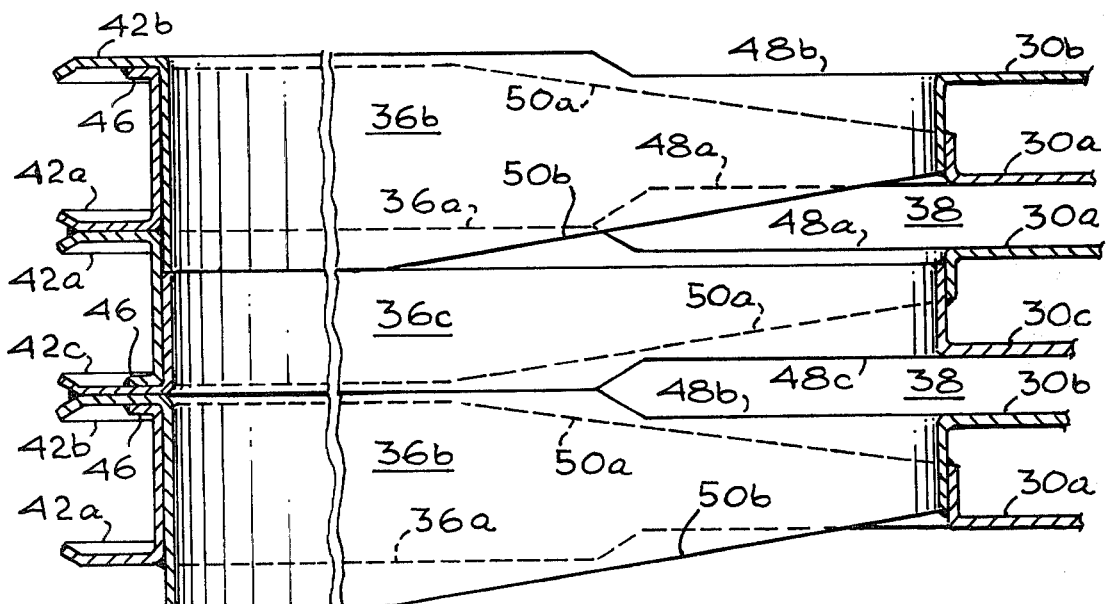
FIG. 9 is a side sectional view showing the elements of FIGS. 6–8 nested together to form a portion of the core of FIG. 4.

The manner in which the plates 30 of the core 12 are nested together can best be seen in FIG. 9 which is an enlarged section generally corresponding to FIG. 5. A single sequence of plates 30 comprises two A-plates, one B-plate and one C-plate. The two A-plates are joined in abutting relationship back to back so that their respective flanges 42a are together. The sequence may be considered beginning at the top of FIG. 9 with a B-plate juxtaposed in upside down relationship to the way in which the plate 30b is shown in FIG. 7, nested within the two abutting A-plates, and followed by a C-plate, also nested within the lower of the two A-plates in abutting relationship with the B-plate above it. The sequence then repeats itself, proceeding in the downward direction in FIG. 9, with another B-plate nested within a pair of abutting A-plates, etc.

For each sequence of four formed plates and nested collars as just described, two air layers with corresponding air openings 38 and two associated gas layers are formed. The upper air opening 38 in FIG. 9 is defined by the juncture of the two offset segments 48a of the abutting A-plates. The lower of the two air openings 38 in FIG. 9 is formed by the juncture of the offset segments 48b and 48c of the abutting B-and C-plates respectively. The diagonal cutouts 50a and 50b serve to provide the desired clearance for communication between the manifold and the respective air openings 38.

FIG. 9 illustrates the manner in which the configuration and dimensions of the respective A-, B- and C-plates, when nested together as shown, serve to provide reinforcement and strengthening for the manifold portion of the core 12. It will be appreciated that the core 12 is pressurized to substantial pressure levels (e.g., in the vicinity of 100 pounds per square inch) in normal operation. Throughout the extent of the manifold, there is a double layer of collar elements 36 by virtue of the insertion of portions 36b and 36c within the abutting portions 36a. Furthermore, the collar 36b overlaps the abutting portion of the two A-plates at the flanges 42a. Moreover, where the B-and C-plates abut at collar portions 36b and 36c without the possibility of an overlapping joint, additional reinforcement is provided for the juncture of the flanges 42b and 42c by the re-entrant portions 46 of the adjacent A-plates. Strengthening of the respective junctures in this fashion serves to resist the so-called "bellows" effect in which a simple flanged plate structure tends to expand in bellows fashion when subjected to pressurized fluids flowing therethrough. Simple flanged structures tend to develop leaks and ruptures about the juncture lines because of failure of the soldering or brazed joint in tension or through successive flexing cycles. The present structure advantageously serves to provide the necessary reinforcement to prevent or minimize the incidents of failure in this manner. Moreover, the configuration of the core structure readily admits of repair by soldering or brazing when a leak or rupture is encountered, since such a failure will occur at a juncture line and all juncture lines, either inside or outside the manifold, are readily accessible to the implements needed to repair the rupture.

Figure 10:
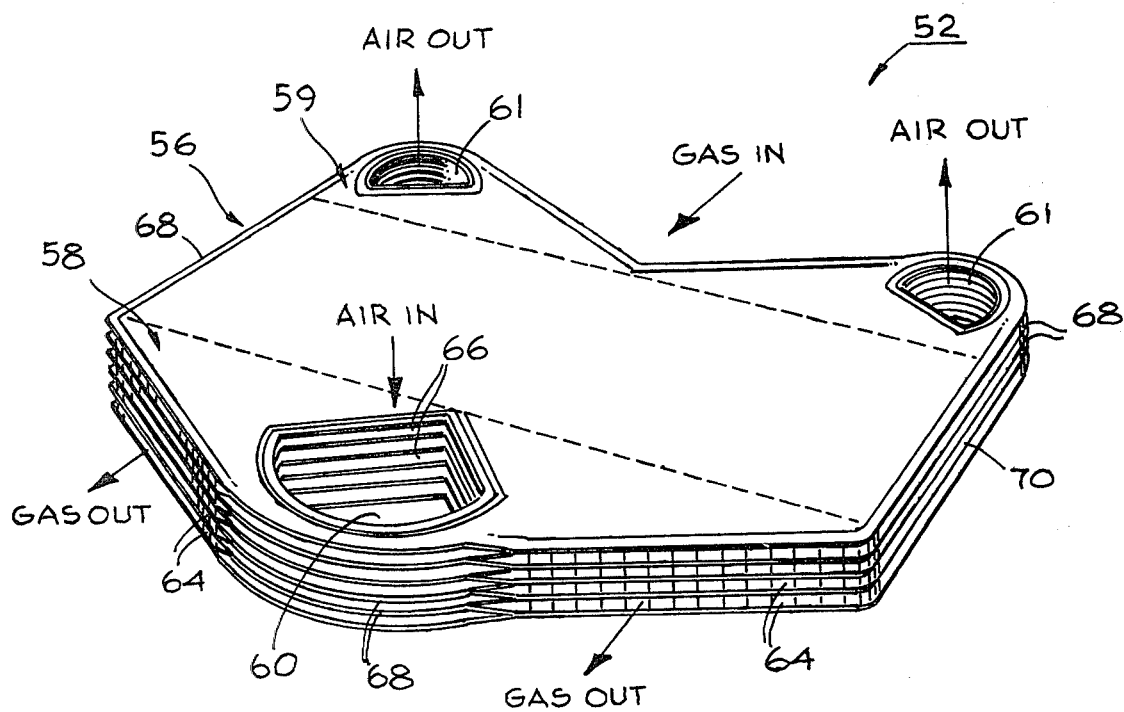
FIG. 10 is a perspective view of an alternate embodiment of that of FIG. 4.
Figure 11:
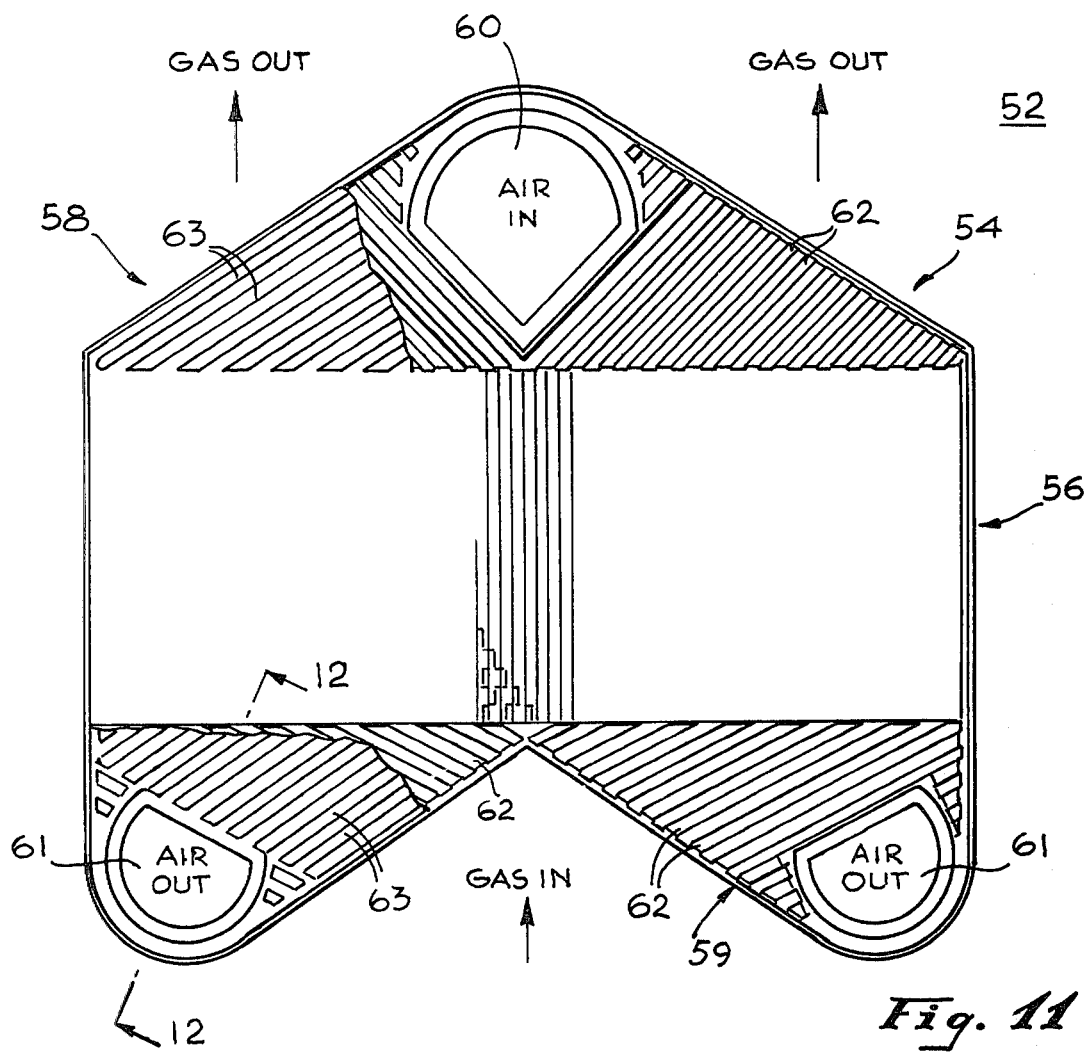
FIG. 11 is a plan view of the embodiment of FIG. 10, partially broken away to show structural details thereof.

An alternative embodiment 52 of a formed plate-fin counterflow heat exchanger core for inclusion in the assemblies 10 and 10A of FIGS. 1 and 2 is represented in FIGS. 10-13. FIG. 10 is a perspective view of the core 52 and FIG. 11 is a plan view of a given plate-fin module 54 comprising the core 52 of FIG. 10. As may be seen particularly in FIG. 11, the core 52 comprises a central counterflow section 56 and opposed end sections 58 and 59. The end sections 58 and 59 respectively include air inlet passage 60 and outlet passages 61 and provide pluralities of ribs 62 defining diagonally directed gas passages and ribs 63 defining diagonally directed air passages for directing both gas and air to and from the central counter-flow section 56 in successive layers thereof. The air passages established by the ribs 63 communicate between the air manifold openings 60, 61 and the air passages of the central core section 56. Similarly, the gas passages established by the ribs 62 communicate between the gas passages of central core section 56 and the gas openings 64 (see FIGS. 10 and 13) extending along the periphery of the end sections 58, 59. Individual air openings 66 provide communication between the individual air passage layers 67 in a manner similar to that already described in connection with the embodiments of FIGS. 3-9.

Figure 12:
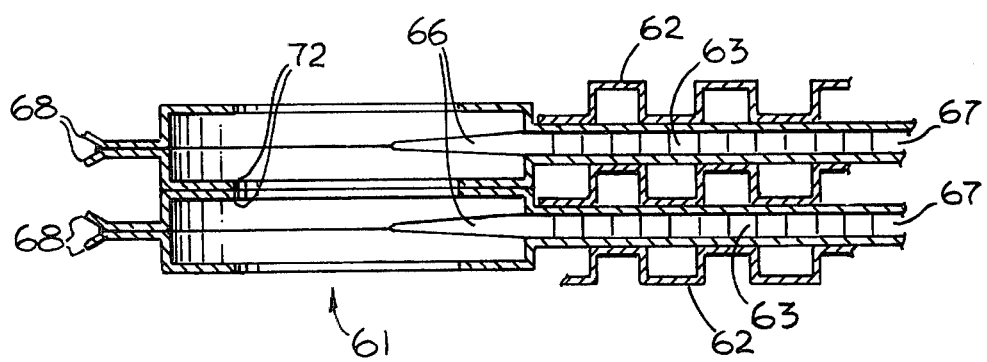
FIG. 12 is a side sectional view, taken at the arrows 12 of FIG. 11.

It will be appreciated that the representation shown in FIG. 11 is partially broken away in order to show the gas passages and the air passages at different levels in the figure. While the structural configuration of the end sections 58 and 59 and the juxtaposition of adjacent air and gas passage layers therein serve to provide a certain degree of heat transfer between the respective fluid streams, the principal transfer of heat between the gas and air streams occurs in the central core section 56. Here the fluids are in true counter-flow relationship with fin elements being provided to develop the desired turbulence and improve the heat transfer characteristics of the structure as well as developing enhanced structure rigidity. In the end sections 58, 59 a general cross-flow relationship obtains between the fluids in adjacent layers. This cross-flow relationship in the end sections is indicated in FIG. 12, which is a partial sectional view taken along the lines 12—12 of FIG. 11. As shown in FIG. 12, the ribs 63 defining the air passages in the end sections 58, 59 are formed from stampings of the individual plates, whereas the ribs 62 defining the gas passages comprise inserts, similar to the finned layers in the central core section 56. The structure is joined together by brazing of soldering the juncture lines at the respective flanges 68. It will be seen that a given flange 68 extends entirely around a plate making up the core 52, thus with the flange of its matching plate providing a completely enclosing seal around the entire air layer 67 between the two plates except for the individual air openings 66 communicating with the air inlet and outlet openings 60, 61. The gas layers, by contrast, are open at the end sections 58, 59, being closed off at the periphery of the central core section 56 by the closed longitudinal surfaces 70 of the gas fin elements therein. The pairs of plates formed together at the flanges 68 are respectively joined together by means of the fin elements and also, at the manifold openings 60, 61, by junctures of the collar flanges 72 which serve to seal the air manifolds from the gas flow passages.

Figure 13:
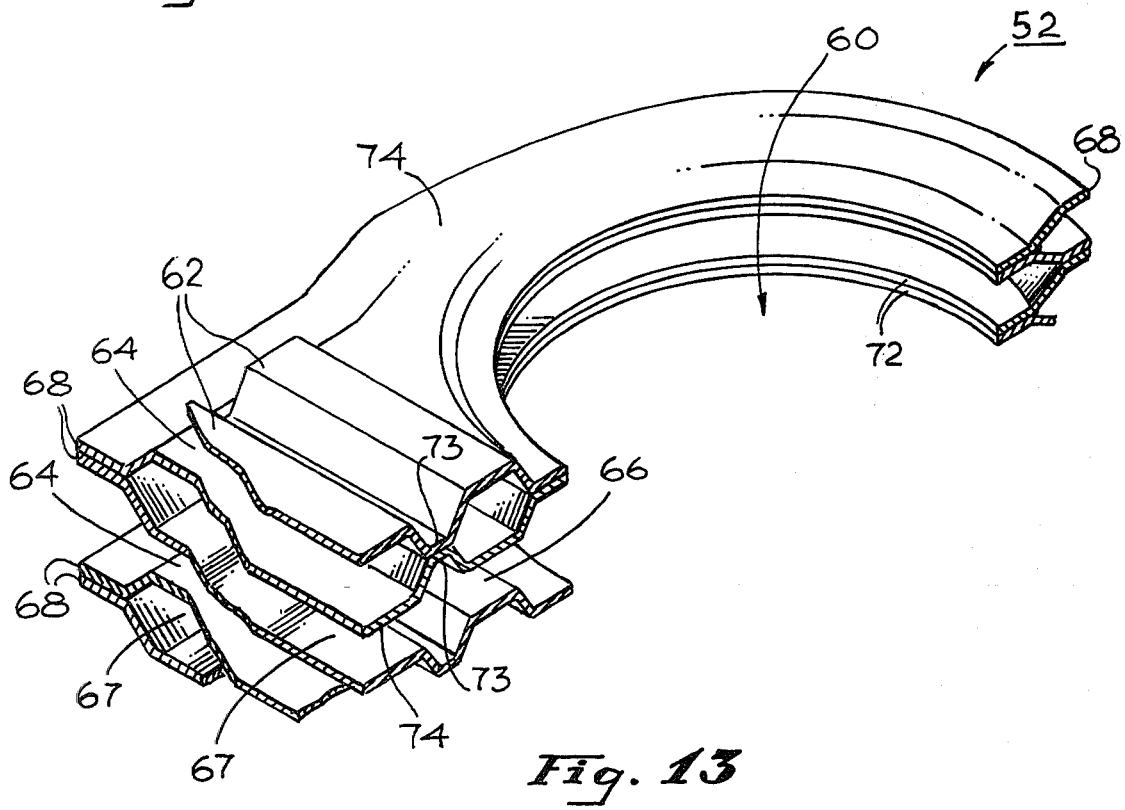
FIG. 13 is a perspective view, partially in section and partially broken away, showing structural details of a portion of the embodiment of FIG. 10.

A slightly different structural configuration is depicted in the partially broken away, sectional perspective view of FIG. 13, representing a structure which may be employed in the embodiment of FIGS. 10-11. In this configuration, the gas passages in the end section 58 are formed by the junctures of ribs 73 of adjacent plates 74 while the air passages or layers 67 are relatively open in communication with the air inlet opening 60. An alternative arrangement to that shown in FIG. 13 provides air passage channels as formed by junctures of ribs 73 of adjacent plates 74 extending transversely to what is presently shown to communicate with the air inlet opening 60, while the gas passages or layers 64 are relatively open to communication with the gas outlet.

Various configurations of elements may be employed to develop the gas and air layers in the sandwich structure of the heat exchanger core. These may include the finned elements as disclosed, which themselves may be of various types. For example, a plain rectangular or rectangular offset fin may be employed. The fins may be triangular or wavy, smooth, perforated or louvered. As an alternative to the plate-fin structure, a pin-fin configuration may be employed. Alternatively, tubular surface geometries may be utilized which encompass configurations of plain tube, dimpled tube and disc finned tube structures. Also, strip finned tube and concentric finned tube configurations may be employed. Some of these structures may be more adaptable to cross-flow than the counter-flow arrangements of the present invention. However, where the structures are utilizable in counter-flow configurations, they may be employed within the scope of the invention.

Where the heat exchanger structure is fabricated of metal, thin metal elements are employed, preferably 0.010" thick type 347 stainless steel. Such material provides an exceedingly favorable thermal stability of the entire structure, since the thermal response characteristics of all structural components are compatible. Other materials may be employed, however. For example, it has been found that embodiments of the invention may be fabricated of ceramic materials which are shaped to the desired configuration and then fired to a permanent hardness. The desired properties of materials suitable for use in the practice of the invention are: a low thermal coefficient of expansion with good thermal shock resistance; good tensile strength; and good workability of the material.

In the fabrication of arrangements in accordance with the invention, the respective plate and fin elements are first prepared, including the structures for the inlet and outlet openings. The various parts are then cleansed as by immersion or spraying with suitable solvents. An ultrasonic cleaning tank may be used if desired. A selected brazing alloy is then deposited on all surfaces which are to be brazed and the various elements are stacked together into an assembly corresponding to the core matrix which is to be fabricated. The assembled parts are then brazed in a controlled atmosphere furnace until all adjacent surfaces are properly brazed. After the completion of the braze operation, the headers 18 and 19 (FIG. 1) and the remainder of the integral air inlet and air outlet ducting are attached to the core matrix and the assembly is then ready for mounting in its housing.

An important feature of the apparatus in accordance with the invention is the method of fabrication such that the structure is provided with integral sheet or plate closures and integral manifolds. This is accomplished by the provision of flange junctures along all closure lines or the combination of flange junctures with overlapping collar segments in the manifold sections. Apparatus fabricated in accordance with the present invention dispenses with the need for special boundary sealing or support elements, such as the header bars which may be employed about the periphery of heat exchangers of the prior art. This is particularly important in applications of apparatus of the present invention where the weight of the structure is a critical factor, as in utilization of the apparatus in motor vehicle, turbine type power plants, because of the problems encountered with thermal stresses where thick-thin material structure is employed. In apparatus in accordance with the present invention, the respective components are all more or less of the same general thickness so that such problems are avoided.

Although there have been described hereinabove specific methods and apparatus of formed plate, counter-flow fluid heat exchanger structures in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the attached claims.

What is claimed is:

1. The method of fabricating an integral manifold-and-core heat exchanger apparatus composed of stacked plates interspersed with turbulence generating support elements in a central section having first and second fluid passages in adjacent parallel heat exchanging relationship, the method comprising in a single cycle the steps of:

forming each of a plurality of plates to have (a) and offset flange extending completely about the periphery of the plate and (b) a collar portion surrounding a manifold section opening through said plate in each of respective end sections on opposite ends of a central section;

cleaning the plates and elements to be joined;

stacking said plates by sets in back-to-back relationship in a sandwith configuration with the collar portions of adjacent pairs in abutting relationship with each other (A) to define manifold sections extending through the stacked plates in each said end section on opposite ends of a central section, which manifold sections communicate with associated first passages in adjacent central sections, and (B) to define openings extending past and sealed off from the manifold sections and communicating between opposite open ends of the stacked configuration via in lieu through associated second passages in adjacent central sections, the first and second passages being in respective alternate layers of the central section for conducting respective fluids in parallel heat exchanging relationship;

during the stacking step, inserting turbulence generating support elements in layers interspersed with said plates, the turbulence generating support elements having surfaces for contacting said plates;

prior to stacking, depositing a brazing alloy on all surfaces which are in contact with each other in the apparatus as assembled;

heating the assembled parts in a controlled atmosphere furnace until all adjacent contacting surfaces are brazed; and attaching integral fluid ducting to the brazed assembly.

2. The method of claim 1 wherein the stacking step further includes placing the peripheral flange of each plate of a back-to-back set in contact with a corresponding peripheral flange of an adjacent set for defining a closed edge about the adjacent plates of said two adjacent sets to establish a first fluid passage.

3. The method of claim 1 wherein the stacking step includes stacking said plates by pairs in said back-to-back relationship.

4. The method of claim 1 wherein the forming step further comprises forming each plate with a pair of collar portions and associated manifold section openings in one end section and a single collar portion and associated manifold section opening in the end section opposite thereto.

5. The method of claim 4 wherein the forming step further comprises forming each plate in a configuration disposed symmetrically about a central longitudinal axis such that the plates when stacked in the sandwich configuration may be joined by pairs in back-to-back relationship with corresponding collar portions of one pair contacting each other and a peripheral flange of a given pair in contact with a corresponding peripheral flange of the adjacent plate of an adjacent pair.

* * * * *

UNITED STATES PATENT AND TRADEMARK OFFICE
CERTIFICATE OF CORRECTION

PATENT NO. : 4,310,960
DATED : January 19, 1982
INVENTOR(S) : Kenneth O. Parker

It is certified that error appears in the above-identified patent and that said Letters Patent are hereby corrected as shown below:

Column 8, line 20, read "and" as --an--.

Signed and Sealed this

Twentieth Day of April 1982

[SEAL]

Attest:

GERALD J. MOSSINGHOFF

*Attesting Officer*  *Commissioner of Patents and Trademarks*